United States Patent [19]

Brie et al.

[11] Patent Number: 4,888,740
[45] Date of Patent: Dec. 19, 1989

[54] DIFFERENTIAL ENERGY ACOUSTIC MEASUREMENTS OF FORMATION CHARACTERISTIC

[75] Inventors: Alain Brie, Mendon, France; Kai Hsu, Danbury, Conn.; Richard A. Plumb, North Tarrytown, N.Y.

[73] Assignee: Schlumberger Technology Corporation, New York, N.Y.

[21] Appl. No.: 869,384

[22] Filed: May 30, 1986

Related U.S. Application Data

[63] Continuation-in-part of Ser. No. 686,127, Dec. 26, 1984, Pat. No. 4,870,627.

[51] Int. Cl.$^4$ .............................................. G01S 1/30
[52] U.S. Cl. .................................... 367/30; 181/102; 73/151
[58] Field of Search .................................... 367/28–31, 367/57, 33; 364/421, 422; 181/102, 105; 73/151

[56] References Cited

U.S. PATENT DOCUMENTS

| | | | |
|---|---|---|---|
| 3,270,316 | 8/1966 | Walker, Jr. et al. | 367/30 |
| 3,334,329 | 8/1967 | Fons et al. | 364/28 |
| 4,131,875 | 12/1978 | Ingram | 340/15.5 |
| 4,432,077 | 2/1984 | Alhilali et al. | 367/31 |
| 4,543,648 | 9/1985 | Hsu | 367/29 |
| 4,562,556 | 12/1985 | Ingram et al. | 367/26 |
| 4,594,691 | 6/1986 | Kimball et al. | 367/30 |
| 4,672,588 | 6/1987 | Willen | 367/28 |
| 4,764,903 | 8/1988 | Siebert | 367/30 |

OTHER PUBLICATIONS

"Semblance Processing of Borehole Acoustic Array Data", by Kimball and Marzetta, Geophysics, vol. 49, No. 3, (Mar., 1984).
"Synthetic Microseismograms: Logging in Porous Formations", by J. H. Rosenbaum; Geophysics, vol. 139, Vol. 1 (Feb., 1974).
"A Long Spaced Acoustic Logging Tool", by Williams et al., presented at the SPWLA Twenty-Fifth Annual Logging Symposium (Held Jun. 10–12, 1984).
"Acoustic Propogation in the Vicinity of Fractures which Intersect a Fluid-Filled Borehole", by F. L. Paillet, presented at the SPWLA Twenty-First Annual Logging Symposium (Jul., 1980).
"Investigation of Acoustic Bonding Waves and Interference Patterns as Techniques for Detecting Fractures", by E. A. Koerperich, Journal of Petroleum Technology, (Aug. 1978).
"Using Compressional and Shear Acoustic Amplitudes for the Location of Fractures", by Morris et al., Journal of Petroleum Technology, (Jun. 1964).
"Permeability Profiles from Acoustic Logging", by J. J. Staal, et al., Journal of Petroleum Technology SPE 6821, (1977).

*Primary Examiner*—Thomas H. Tarcza
*Assistant Examiner*—Daniel T. Pihulic
*Attorney, Agent, or Firm*—Clifford L. Tager; Keith G. W. Smith

[57] ABSTRACT

A method for acoustically investigating characteristics of formations penetrated by a borehole such as fractures by taking differential Stoneley wave acoustic energy measurements between pairs of receivers of an array of receivers carried by a logging tool. The receivers of each pair all have the same spacing. The energy is that detected by the receivers in response to acoustic pulses generated by a transmitter spaced from the receivers on the tool. The differential energy measurements are stacked to obtain a stacked differential energy log.

47 Claims, 10 Drawing Sheets

DIFFERENTIAL ENERGY ACOUSTIC MEASUREMENTS OF FORMATION CHARACTERISTIC

This is a continuation-in-part of application Ser. No. 686,127, filed Dec. 26, 1984, now U.S. Pat. No. 4,870,627.

FIELD OF THE INVENTION

This invention relates to a method for measuring characteristics of earth formations penetrated by a borehole and more particularly to a method for detecting and evaluating formation characteristics with differential energy measurements.

BACKGROUND OF THE INVENTION

In typical acoustic investigations of earth formations from inside a borehole a tool is used with an acoustic pulse generating transmitter and a plurality of acoustic receivers. The receivers are spaced from the transmitter and produce waveforms representative of the acoustic waves incident upon the receivers after having traveled through the earth formations and the borehole. The acoustic waves arriving at the receivers include those of different wave propagation modes such as the compressional, shear and Stoneley waves. The Stoneley waves are deemed as late arrivals, i.e. waves whose velocity is less (or whose slowness is greater) than the direct or mud wave (see U.S. Pat. No. 4,131,875 to Ingram). The acoustic tool may be constructed with a acoustic pulse transmitter and several receivers such as four in the Ingram patent or twelve as described in an article entitled "Semblance Processing Of Borehole Acoustic Array Data" by Kimball and Marzetta and published in Geophysics Vol. 49, No. 3, March 1984, and in U.S. Pat. No. 4,594,691 entitled "Sonic Well Logging" which will issue on June 10, 1986.

Late arrival waves, such as zero order, low frequency Stoneley waves are boundary waves whose amplitudes in homogeneous and non-fractured earth formations exhibit little or no attenuation over the transmitter-receiver spacings normally encountered with acoustic borehole logging tools. Such late arrival waves, however, are known to be sensitive to variations in the borehole diameter, the permeability of the earth formation and the presence of fractures. Such sensitivity is revealed by a change in the amplitude of the late arrival wave.

For example, an article entitled "Synthetic Microseismograms; Logging In Porous Formations," by J. H. Rosenbaum and published in Geophysics Vol. 39, No. 1 (February, 1974) at pages 14–32 describes a theoretical technique using Stoneley waves to obtain an indication of permeability from a measurement of their attenuation. U.S. Pat. No. 4,432,077 and an article entitled "A Long Spaced Acoustic Logging Tool" by Williams et al and presented at the SPWLA twenty-fifth annual logging symposium held in June 10-13, 1984 describe a technique to obtain an indication of permeability by measuring amplitude loss or energy loss of the tube wave and using the ratio of these parameters as detected by two vertically spaced receivers located in a borehole. A standard well known variable density display (VDL) of detected acoustic waves is shown and an increased signal-to-noise ratio is obtained by real-time stacking of eight waveforms generated by each receiver and attributable to different transmitter pulses. E. A. Koerperich presented a paper published at pages 1199–1207 in the August, 1978 issue of the Journal of Petroleum Technology entitled "Investigation of Acoustic Boundary Waves and Interference Patterns as Techniques for Detecting Fractures". In this article the use of low frequency Stoneley waves to identify fractures is suggested.

Techniques have been described for using an acoustic logging tool with a receiver array containing a large number of linearly spaced receives, such as 8 or 12. For instance, U.S. Pat. No. 4,543,648 to Hsu describes a technique in which overlapping values of coherence information contained in waveforms generated by sub-arrays of receivers in response to a series of pulses generated by the acoustic source are stacked to enhance the measurement of slowness values relevant to a particular depth interval.

SUMMARY OF THE INVENTION

In accordance with the present invention a characteristic of subsurface earth formations penetrated by a borehole can be detected and investigated with the use of a tool carrying an array of acoustic receivers and an acoustic pulse transmitter spaced from the receiver array which generates acoustic pulses as the tool is drawn through the borehole. The portions of the waveforms output by each receiver corresponding to a given acoustic propagation mode are selected. Differential energy measurements are made which are representative of the ratio of the energies in such selected portions of the waveforms output by pairs of receivers in response to successive operations of the acoustic transmitter. The differential energy measurements for the receiver pairs are referred to the depths at which the measurements were taken and stacked to obtain a log of stacked differential energy verses depth.

When the given acoustic propagation mode is the Stoneley wave, the stacked differential energy log is particularly sensitive to fractures in formations intersecting the borehole. A stacked differential energy log for closely spaced receiver pairs is capable of resolving small localized events in the borehole such as bed boundaries as well as larger events such as fractures. In a stacked differential energy log for pairs of widely spaced receivers information concerning bed boundaries and small borehole irregularities tends to be smoothed out so that only the dominant fracture information is left.

In accordance with a variation in the method of the invention, referred to as "transmitter section processing" the differential energy measurements are made between pairs of shots rather than between pairs of receivers as in the receiver section processing described above. The stacking of differential energy measurements obtained by transmitter section processing with those obtained by receiver section processing offers further improvements in the stacked log since measurement variations caused by effects such as bed boundaries and borehole enlargements anticorrelate between the two and tend to cancel out thereby improving the fracture indication.

The method in accordance with the present invention can also be implemented using a tool having a plurality of transmitters and a single receiver. In that event the differential energy measured is that received by the receiver in response to successive pulses generated by different transmitters. It is also possible to implement the method of this invention with a tool having a plurality of transmitters and receivers.

These and other advantages and features of the invention can be understood from the following detailed description of the illustrated embodiment of the invention as described in conjunction with the accompanying drawings.

DETAILED DESCRIPTION

Figure 1:
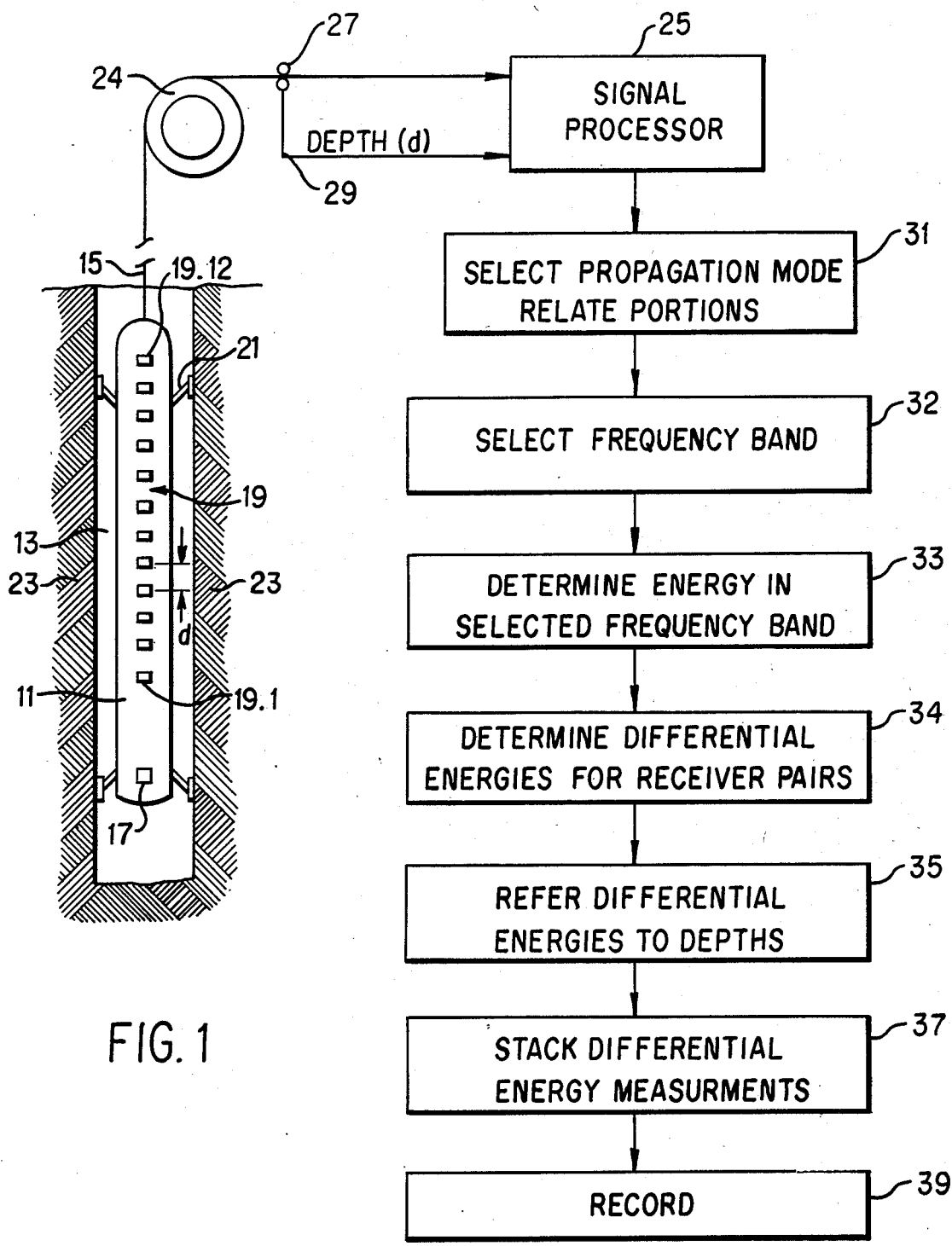
FIG. 1 is a schematic and block diagram of one technique for differential measurements in boreholes in accordance with the invention.

With reference to FIG. 1 of the drawings, tool 11 is shown suspended in a borehole 13 from an armored communication cable 15. Tool 11 is constructed for movement up and down the borehole 13 and includes an acoustic pulse transmitter or source 17. Also shown in tool 11 is a linear array of 12 equally spaced acoustic pulse receivers 19 which are aligned along the direction of the borehole axis. The receivers 19 form an overall receiver array aperture that extends between the farthest spaced of the receivers 19. The distance "d" between adjacent receivers 19 is preferably less than half a wavelength of the acoustic signal being detected and may, for instance, be six inches. The distance between the acoustic transmitter 17 and the closest of the receivers 19 is in the range of 5 to 25 feet with 13 feet being a frequently used distance. The caliper 21 may be used to physically sense the diameter of the borehole 13.

The borehole 13 is normally filled with a drilling fluid such as drilling mud which acts to lubricate the drill bit during drilling operations and to prevent the collapse of the walls of the borehole 13. As the tool 11 is drawn up the borehole 13, the acoustic pulse transmitter 17 is regularly operated to generate pulses of acoustic energy which pass through the drilling mud and the formations 23 surrounding the borehole 13 and are detected by the receivers 19.1–12. For example, for ease of description, if the tool 11 is moved at a speed of about six inches per second (1,800 feet/hour) and the acoustic transmitter 17 is operated at a rate of about one time per second, the tool 11 moves about six inches between successive transmitter pulses. Thus, if a point on the borehole wall is adjacent to the upper-most receiver 19.12 when the source 17 generates a first acoustic pulse, successive receivers of the array 19 are adjacent such point on the borehole wall for successive actuations of the acoustic transmitter 17.

In an actual logging operation the tool may travel at a speed different from six inches per second, for instance three inches per second, and the source 17 may be fired more frequently than one time per second. The frequency of operation of the transmitter 17 should be selected so that there is enough time between pulses for each receiver 19.1–12 to detect arriving acoustic energy for a sufficiently long time to produce a waveform signal containing the acoustic propagation modes of interest well before the energy from a subsequent acoustic pulse arrives at the receiver. The duration of the detected waveform signals may be on the order of five milliseconds long. The waveforms may be digitized at an effectively very high rate so as to sample each detected waveform, for example, every ten microseconds.

Each receiver 19 outputs a waveform representative of the acoustic energy it receives as a result of each pulse generated by acoustic pulse transmitters 17. As is well known in the art, this acoustic energy travels between the transmitter and the receiver in a number of different propagation modes including those referred to as the compressional, shear and Stoneley waves. When accurately detected each of these propagation modes may provide significant information about the earth formation penetrated by the borehole.

Although, the waveforms generated by the receivers 19 are preferably processed in a digital format they could be processed in analog form. In addition, the processing of the waveform signals in accordance with the invention may be done either while the tool is being moved and operated in the borehole or at a subsequent time. The references to processing of waveforms as used here are thus intended to include both real time and delayed processing of the signals generated while logging a borehole.

The waveforms may be digitized downhole in the tool 11 and then transmitted up the cable 15 past the sheave wheel 24 located at the surface to the signal processor 25. The depth of the tool 11 may be measured with a depth sensor 27 coupled to the cable 15 which produces a depth signal on line 29. If necessary a precision depth calculator may be used with information from a tool located accelerometer to more precisely determine the depth of the tool 11 in the manner described in the U.S. Pat. No. 4,545,242 entitled "Method and Apparatus for Measuring the Depth of a Tool in a Borehole" invented by David S. K. Chan. Data generated by the caliper 21 is also transmitted uphole on cable 15 to signal processor 25.

The blocks in FIG. 1 illustrate the steps of the method in accordance with the invention. In block 31 the signal processor 25 first selects a portion of the waveform from each of the receivers 19 corresponding to the particular acoustic propagation mode of interest. This selection can be done by windowing techniques in the time or frequency domain as is explained in more detail below.

Next in block 32, in certain embodiments of the invention, a band in the frequency domain is selected and, in block 33, a measurement representative of the energy within the selected frequency band of the waveform portion selected in block 31 is determined.

In block 34, the differential energies for selected receiver pairs are determined. This is accomplished by taking the ratio for each actuation of the source 17 of the energy measurement determined in block 33 for each of the pairs of receivers or by taking the difference of the logarithms of such energies.

Following this, in block 35, the differential energy measurements are referred to the depth at which the measurements are taken for each pair of receivers 19. The depth normally used is that of the mid point between the two receivers 19 of the pair at the time that the acoustic pulse from the transmitter 17 is received. Since the speed of sound in the borehole 13 and formations 23 is much higher than the speed with which the tool 11 is drawn through the borehole 13 and the duration of the waveform is very short compared to the tool speed, the location of the midpoint between the receivers of the pair is considered fixed for the response of the receivers 19 to a single pulse from source 17. Thus, for each selected pair of receivers 19 there is generated a set of measurements of differential energies versus the depth of the midpoint of the pair of receivers 19 in the borehole as the tool 11 is drawn through the borehole by cable 15. These measurements are preferably normalized by dividing by the receiver pair spacing.

There is tradeoff between the resolution achievable by the differential energy waveforms generated by a pair of receivers 19 and the measurement statistics (i.e., accuracy or variance). As the distance between a pair a receivers increases, the quality of the measurement improves while the resolution decreases. Thus, for a widely separated pair of receivers the noise inherent in the measurement tends to average out while for shorter separations between receivers 19, there is less averaging so the measurement is noisier, but it is more responsive to variations in the formation characteristic which are of small spatial extent along the borehole. In addition, the wavelength of the acoustic signal plays a fundamental role in that it becomes difficult to resolve formation characteristics that take place in an interval that is very much shorter than half a wavelength of the acoustic signal.

Next, as indicated in block 37, the differential energy measurements for the pairs of receivers 19 are stacked by referring the measurements to the depths at which they were taken, adding together those associated with each depth, and dividing by the number of receiver pairs. It is preferable to stack together only measurements associated with receiver pairs having the same separation since the resolution of the differential energy measurements corresponding to receiver pairs of different separations will be different. Thus, in block 37 the signal processor 25 can produce several stacked differential energy logs each corresponding to receiver pairs having a particular spacing. As is discussed in more detail below, the stacked log has a substantially higher signal to noise ratio than that of the individual differential energy waveforms of the receiver pairs. Stacking also provides a more reliable measurement since the effects of variations in the gain of the individual acoustic receivers 19 tend to average out in the stacked logs and the spurious low frequency variations that especially effect the measurements taken by receiver pairs near the ends of the array are largely eliminated.

As indicated in block 39, the stacked waveforms and other information may be recorded on hard copy or in electronic or magnetic media for further processing or examination.

While the method in accordance with the invention is useful for differential energy measurements of compressional and shear waves, much of the following discussion of the illustrated embodiment of the invention is directed to the detection and use of the Stoneley wave portion of the waveforms generated by the transducing 19, particularly as applied to the detection of fractures in the formations intersecting the borehole. The location of fractures and the knowledge of their characteristics is of primary importance for oil and gas production in hardrock areas. The methods in accordance with the invention are particularly applicable for the description of heterogeneous properties of the formations and especially of fractured systems.

Figure 2:
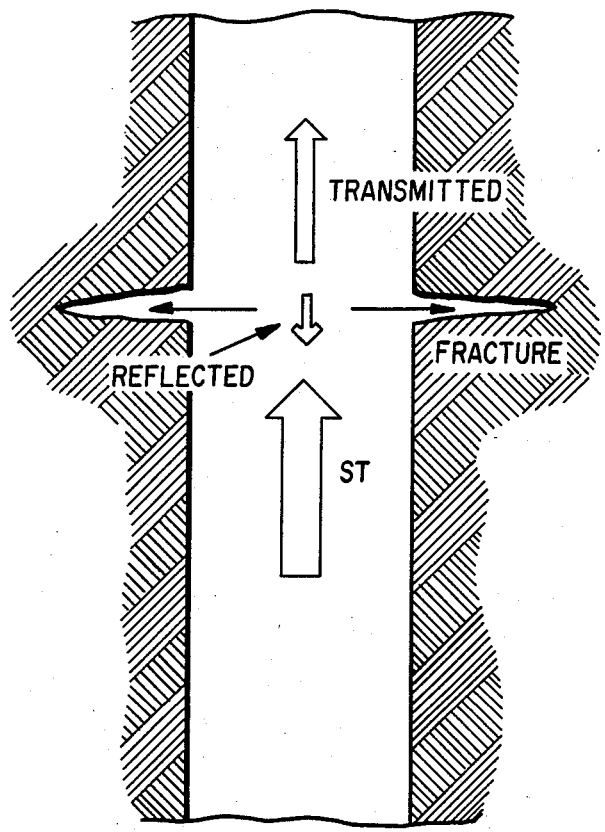
FIG. 2 is a diagram showing the attenuation mechanism for a Stoneley wave when it encounters a fracture.

The Stoneley wave and especially its low frequency component known as the tube wave is a borehole fluid mode that propagates as a pressure wave along the borehole. As illustrated in FIG. 2 of the drawings, upon passing a fracture intersecting the borehole, the Stoneley wave applies pressure to the fluid facing the crack, and if the crack is permeable, some fluid flows into it, resulting in the pressure drop in the borehole, and hence an attenuation of the direct Stoneley wave (transmission losses) and the generation of a reflected Stoneley wave. The magnitude of the reflected wave is small enough that it does not interfere with the borehole measurements in accordance with the invention. An important property of the above described effect is that the amount of attenuation can be related to the fluid flow in the fracture, thus giving an indication of the fracture opening and of permeability.

Figure 3:
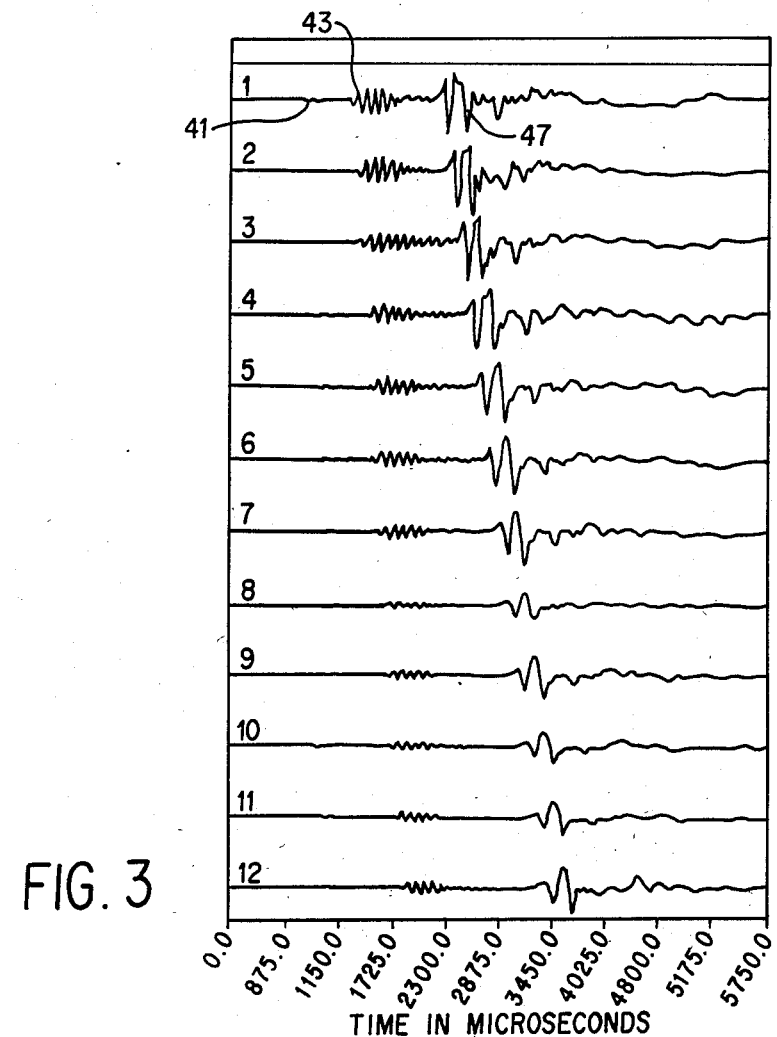
FIG. 3 is a diagram of typical waveforms generated by an array of acoustic receivers.

Referring now to FIG. 3 of the drawings there is illustrated a typical set of waveforms generated by acoustic receivers 19 in response to an acoustic pulse generated by a source 17 when logging a hardrock formation. It is easy to recognize the three major components of each waveform. For instance, in the waveform number 1 generated by acoustic receiver 19.1 the first portion 41 of the waveform represents the compressional wave, the second portion 43 represents the shear wave, and the final portion 47 is the Stoneley wave. The waveforms 2 through 12 all show the same three propagation modes as waveform number one. Each however slightly displaced in time from the proceeding one because of the time required for the waveform to travel up the borehole 13 to arrive at each of the acoustic receivers 19.2-12. In addition the portions attributable to the different propagation modes tend to separate from one another for the receivers 19 farther from the source 17 because of the different velocities of the three modes.

Figure 4:
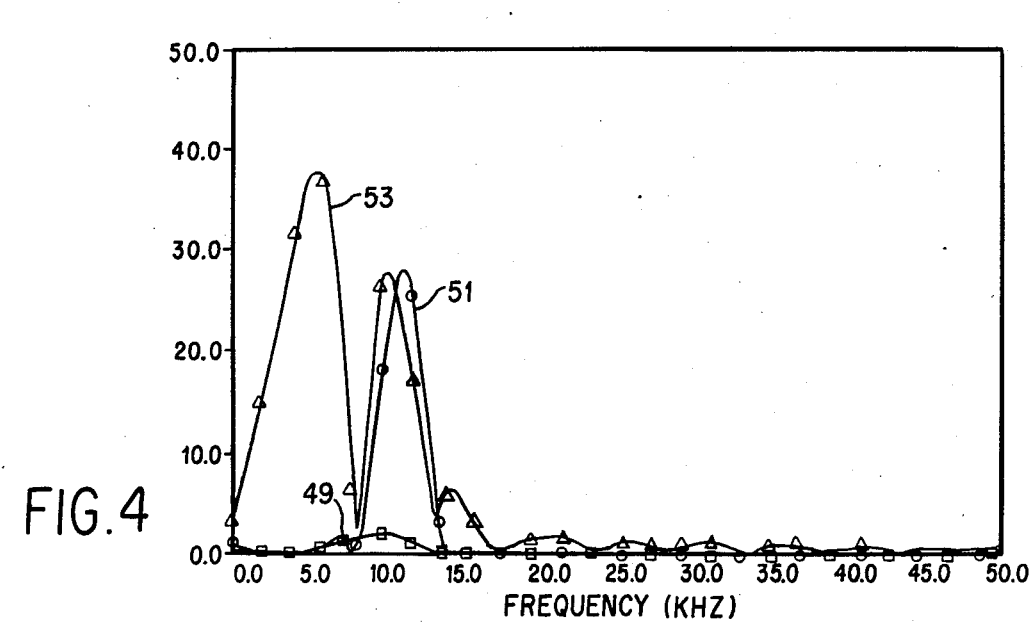
FIG. 4 is a graph showing the frequency content of the compressional, shear and Stoneley waves included in one of the waveforms in FIG. 3.

A graph of the amplitude versus frequency of each component of waveform number 1 of FIG. 3 is illustrated in FIG. 4. The compressional wave 49 and shear wave 51 both have energies centered at approximately 10 kHz and have little or no energy content below about 5 kHz. The Stoneley wave 53 is the strongest of the three components and has two major peaks, the larger one centered around about 5 kHz. Even though the exact distribution may change somewhat under different conditions basically similar patterns exists for all hardrock formations.

In order to separate the Stoneley wave information from the compressional and shear waves, it is possible to select the low frequency portion of the waveform generated by a receiver 19 with a passband filter having a passband between for example 2 and 4 kHz.

Since the compressional and shear waves are both centered near 10 kHz it is generally not practicable to separate out one of these waveforms with frequency domain filtering techniques. To isolate the compressional or shear waves, it is normally the practice to define a time window of approximately 500 microseconds and to accept only the portion of the waveform falling within the time window. The location of the time window can be determined by well known techniques such as the "first motion detection" method which detects the first excursion of an arriving waveform beyond a threshold in order to locate the compressional wave arrival. With this information and a knowledge of the distance between the transmitter 17 and the receiver 19 and of the velocity of the acoustic propagation modes in the particular type of formation or in the borehole, it is possible to estimate the arrival times of the shear and Stoneley waveforms.

In accordance with another technique, referred to as slowness time coherence processing, the received waveforms are preprocessed to obtain the arrival time of all three of the propagation waveforms. This technique is described in the Kimball and Marzetta paper and patent referred to above.

Stoneley waves may be also selected by first time windowing the waveforms generated by the receiver 19 and then passing the windowed portion through a low pass or band pass filter in a manner as more particularly described in the U.S. Pat. No. 4,131,875 to Ingram. The window for the Stoneley wave should be on the order of 2000 microseconds long. The filtering may be done with a digital recursive filter when digital samples are employed or by using an analog filter when the digital windowed portion is converted to an analog form with a d/a converter.

The distance between the transmitter 17 and the nearest receiver 19 should be adequate to allow the separation in time of the compressional, shear and Stoneley wave portions of waveform 1 in FIG. 4. The use of the frequency domain filtering technique to separate the Stoneley wave portion of waveform 1 has the advantage that it does not require any knowledge of the velocities or of the arrival times of the different acoustic propagation modes making up waveform 1.

Figure 5:
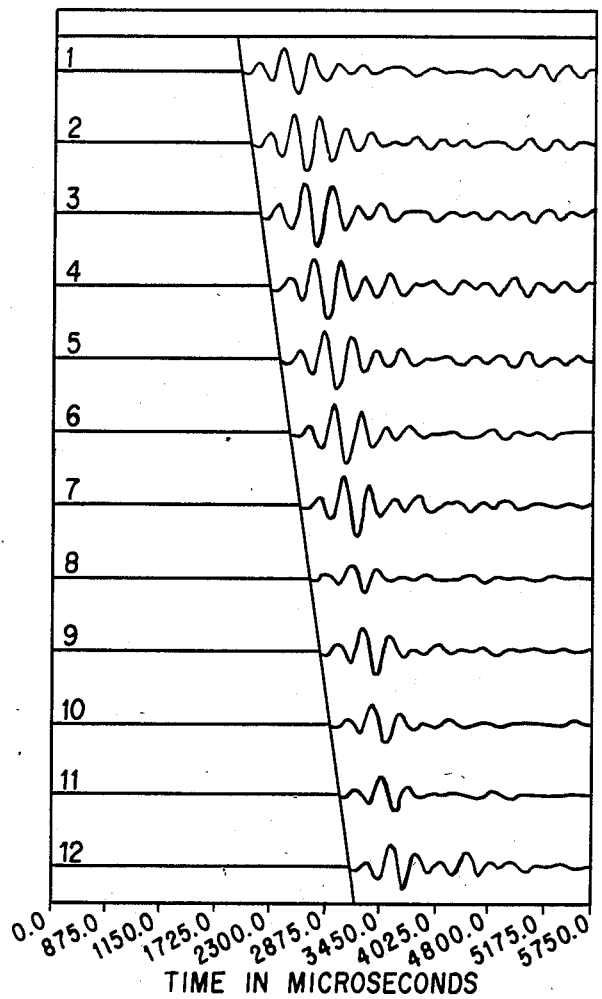
FIG. 5 is a graph of the filtered Stoneley wave portions of the waveforms of FIG. 3.

The application of one of the above described techniques to the waveform signals illustrated in FIG. 3 of the drawing results in the waveforms illustrated in FIG. 5 in which the compressional and shear waves have disappeared and only the low frequency Stoneley wave remains.

Figure 6:
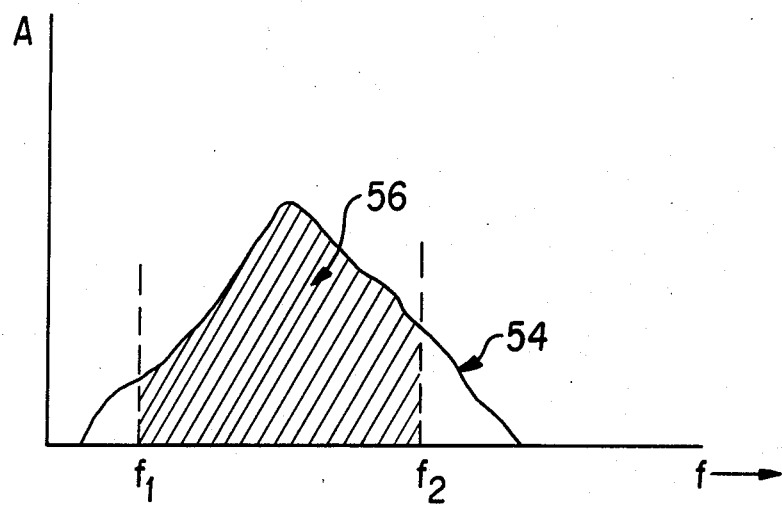
FIG. 6 is a graph in the frequency domain of the absolute value of the amplitude of one of the Stoneley waves of FIG. 5.

A measurement corresponding to the energy contained in the Stoneley wave portion of each the waveforms of FIG. 5 may be obtained by taking the sum of the squares of the amplitudes of the samples contained in the digitized wave forms of FIG. 5 and dividing by the number of samples. Ten times the logarithm of this value is the energy expressed in dB. Alternatively, the measurements of the energies may be obtained by well known techniques of processing the Stoneley wave portions in the frequency domain. For instance, referring to FIG. 6 of the drawing there is illustrated a graph of the absolute value of a typical Stoneley wave portion 54 versus frequency which has been separated from a waveform such as shown in FIG. 5 by the time windowing techniques described above. In one method of energy determination, referred to as the "fixed band" method, the user selects the upper and lower frequency limits f2 and f1, respectively, and the area within the shaded area 56 under the portion of the curve 54 between f1 and f2 is determined by integration. The result is normalized by dividing by the length of the time window used to separate the Stoneley wave portion.

Figure 7:
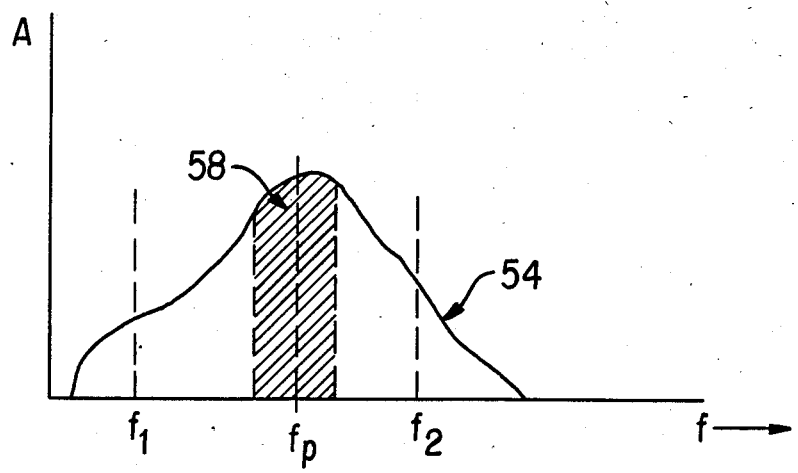
FIG. 7 is a graph in the frequency domain of the absolute value of the amplitude of one of the Stoneley waves of FIG. 5.

Another related method for determining the energies, referred to as the "peak frequency" method, is illustrated in FIG. 7 of the drawings. In accordance with this method, the upper and lower frequency limits, f1 and f2, are again selected by the user and the signal processor 25 locates the highest amplitude peak within the frequency band between f1 and f2. The processor 25 then integrates the signal in a relatively narrow frequency band 58 around the frequency fp of the amplitude peak. The width of the frequency band 58 is inversely related to the width of the time window used to select the Stoneley wave portion.

Figure 8:
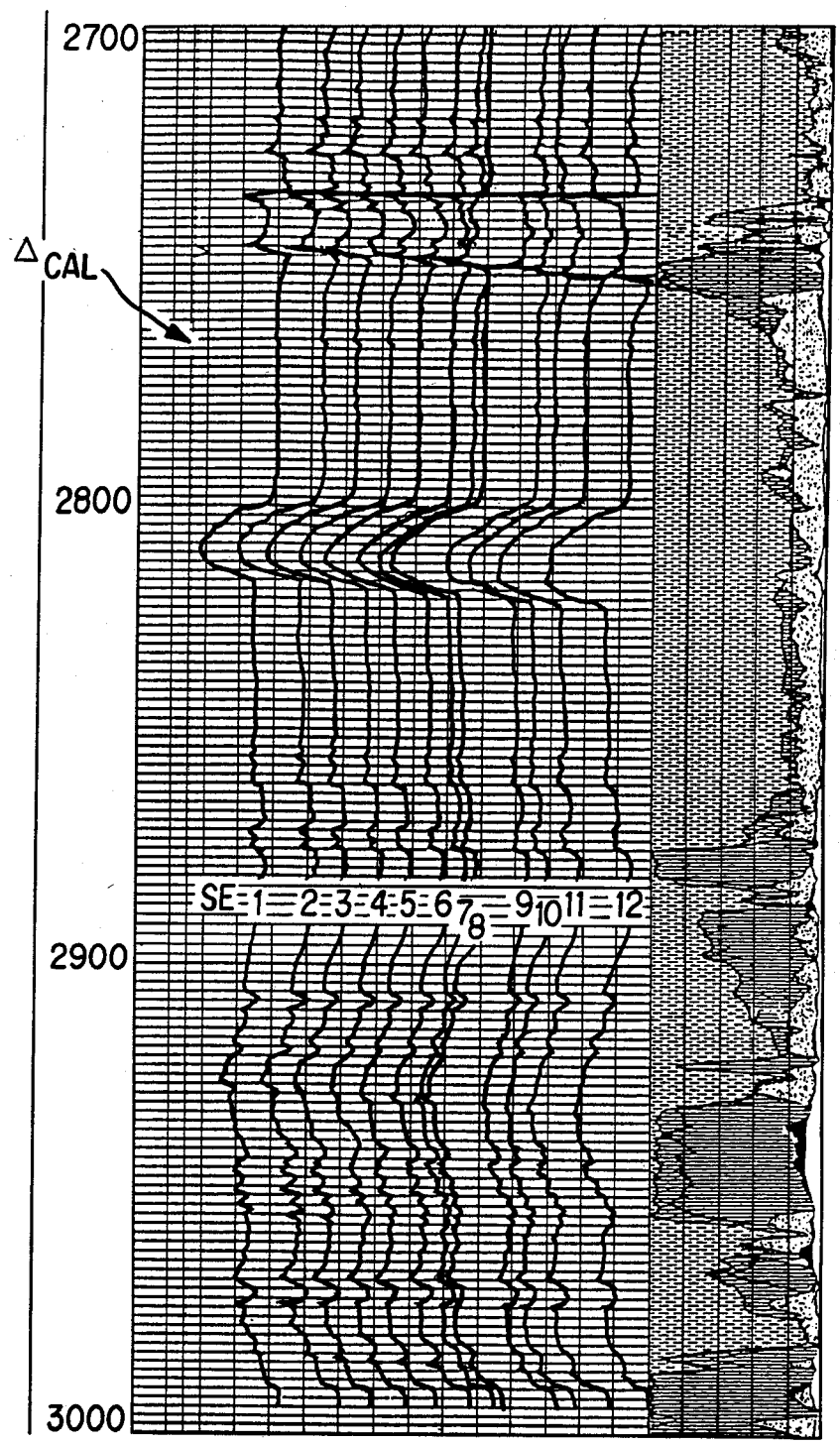
FIG. 8 shows a well log chart versus depth of the energy of the Stoneley wave portions of the waveforms output by the receivers in the tool of FIG. 1.

A well log showing a plot of the logarithm of twelve individual Stoneley wave energy measurements corresponding to the twelve receivers 19 obtained in a typical test well is shown in FIG. 8 of the drawings. The measurements are aligned by depth and are shifted laterally by constant amount to separate them. They would therefore be equally spaced if all of the receivers 19 had the same gain. However, since the gain of the receivers 19 varies there is some dispersion in the values of the curves which is particularly visible in curve 8. Since, on a logarithmic scale, a change in gain appears as a constant shift, all the curves correlate well and experience essentially equal excursions.

Comparing the logarithmic energy curves with a lithology interpretation shown on the right of the well log of FIG. 8 it can be seen that some of the variations in the energy curves are associated with lithology changes such as in the lower portion of the log chart corresponding to depths of between approximately 2870 feet and 3000 feet. The changes in the energy between 2800 feet and 2821 feet however, are not accompanied by any change in lithology which indicates that the energy drop is caused by the presence of a fracture in the formation at approximately 2814 feet. Since each of the curves plotted in FIG. 8 is of the total energy drop between the transmitter 17 and a corresponding one of the receivers 19 referred to the midpoint between the two, the vertical resolution of these curves is poor and the coupling at the transmitter affects the curves, making them sensitive to many different effects such as lithology and porosity and making the fracture indications vague and unclear.

In order to overcome this problem in accordance with the method of the invention, measurements are taken between pairs of receivers 19 by measuring the difference in the energy detected by them in response to acoustic pulses from the transmitter 17. The measurement of this differential energy can be accomplished either by taking an a ratio of the energies in the propagation mode of interest received by the two receivers 19 of each pair or by forming the difference of the logarithms of the two energies. This in effect gives a measurement of events between the two receivers 19 of the pair and essentially eliminates the effect of events between the transmitter 17 and the closer of the two receivers 19 of the pair. Stated differently, the measurement in effect represents the differential energy between an acoustic pulse that has traversed the depth interval between a pair of receivers and one that has not, but whose paths through the formation and borehole are otherwise substantially the same.

The measurement is normalized to make possible comparison between measurements obtained from pairs of receivers 19 with different spacings, and to this end the differential energy measurement is divided by the interval separating the receivers 19 of the pair. This normalization is important since the attenuation effect of a fracture as the Stoneley wave is not a point phenomenon but has a cumulative effect over a considerable length of the borehole 13. The differential energy measurement for closely spaced pairs of receivers 19 do not feel the full effect of a fracture-caused attenuation such as would one for a larger receiver pair interval. Thus the normalization is needed to allow one to compare the fracture caused variations in the stacked differential energy logs of differently spaced receiver pairs.

Since the tool 11 illustrated in FIG. 1 has 12 receivers spaced ½ foot apart it is possible to obtain 11 normalized differential energy measurements with a ½ foot spacing, ten measurements with a one foot spacing, nine measurements with an eighteen inches spaces, etc. In total, with 12, receivers it is possible to obtain 66 measurements for each firing of the source 17.

Each of these measurements is referred to a depth in the borehole 13 corresponding to the midpoint between the two receivers 19 of the pair at the time the measurement is taken. Thus, the 66 measurements obtained in response to one actuation of transmitter 17 refer to several different depths in the borehole 13.

Figure 9:
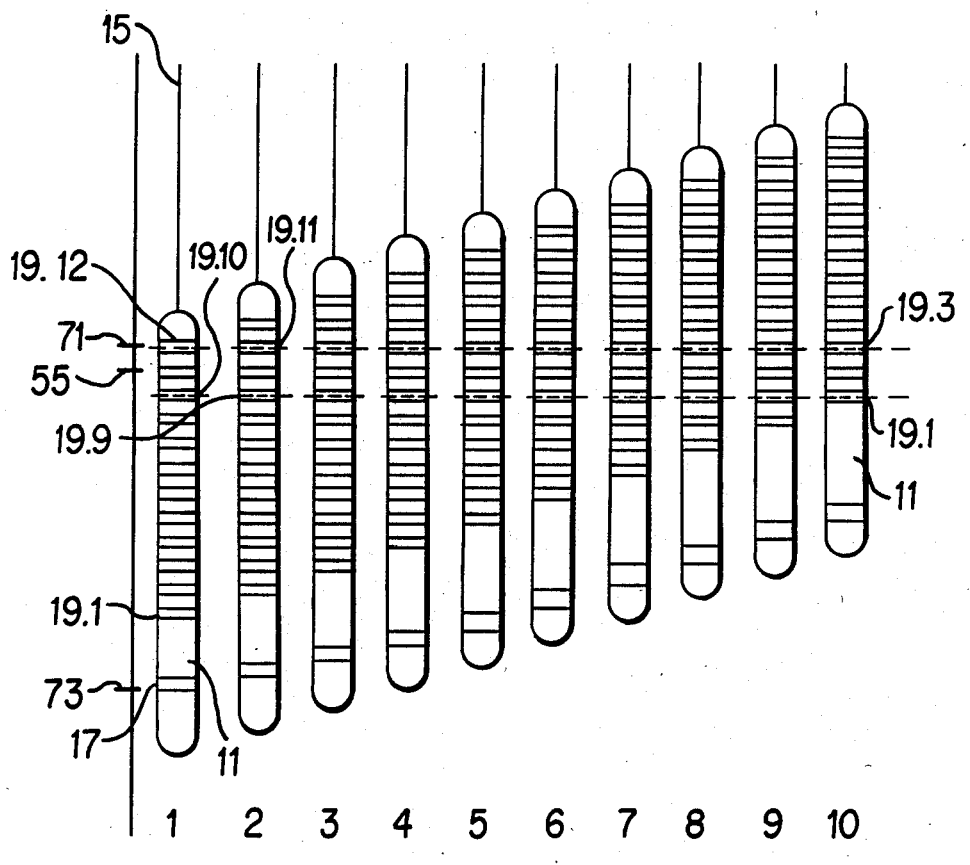
FIG. 9 shows the positions of the logging tool for successive firings of the acoustic transmitters.

Referring now to FIG. 9 of the drawings, ten successive positions of the tool 11 are illustrated as it is drawn upwardly through the borehole 13 by the cable 15. For ease of description we consider the situation where the tool 11 is drawn through the borehole at 13 at a speed of six inches per second and the acoustic source 17 is fired once every second. Location 55 on the wall of borehole 13 is midway between the positions of acoustic receivers 19.10 and 19.12 when the source 17 is fired with the tool in position 1 illustrated at the left-most side of FIG. 7. Thus, the differential energy measurement made by the pair of receivers 19.10 and 19.12 is referred to the depth at location 55. On the next firing of the acoustic source 17 the tool 11 will have moved to position 2 in FIG. 7 so that the midpoint between receivers 19.9 and 19.11 is adjacent location 55 on the wall of borehole 13. In like manner, for successive firings of the source 17 as the tool is drawn up the borehole 13, successive pairs of transducers 19 are adjacent location 55 until, in position 10 at the right hand side of FIG. 7, transducers 19.1 and 19.3 are adjacent location 55 when the transmitter 17 is fired. Thus, the tool 11 takes ten differential energy measurements for receivers 19 having a one foot spacing referenced to location 55 as it is drawn up the borehole. Since each of these measurements is taken with a different pair of receivers 19 having different gains and noise conditions vary for successive shots of the source 17, there are differences in the differential measurements taken from the successive pairs of receivers 19.

Figure 10:
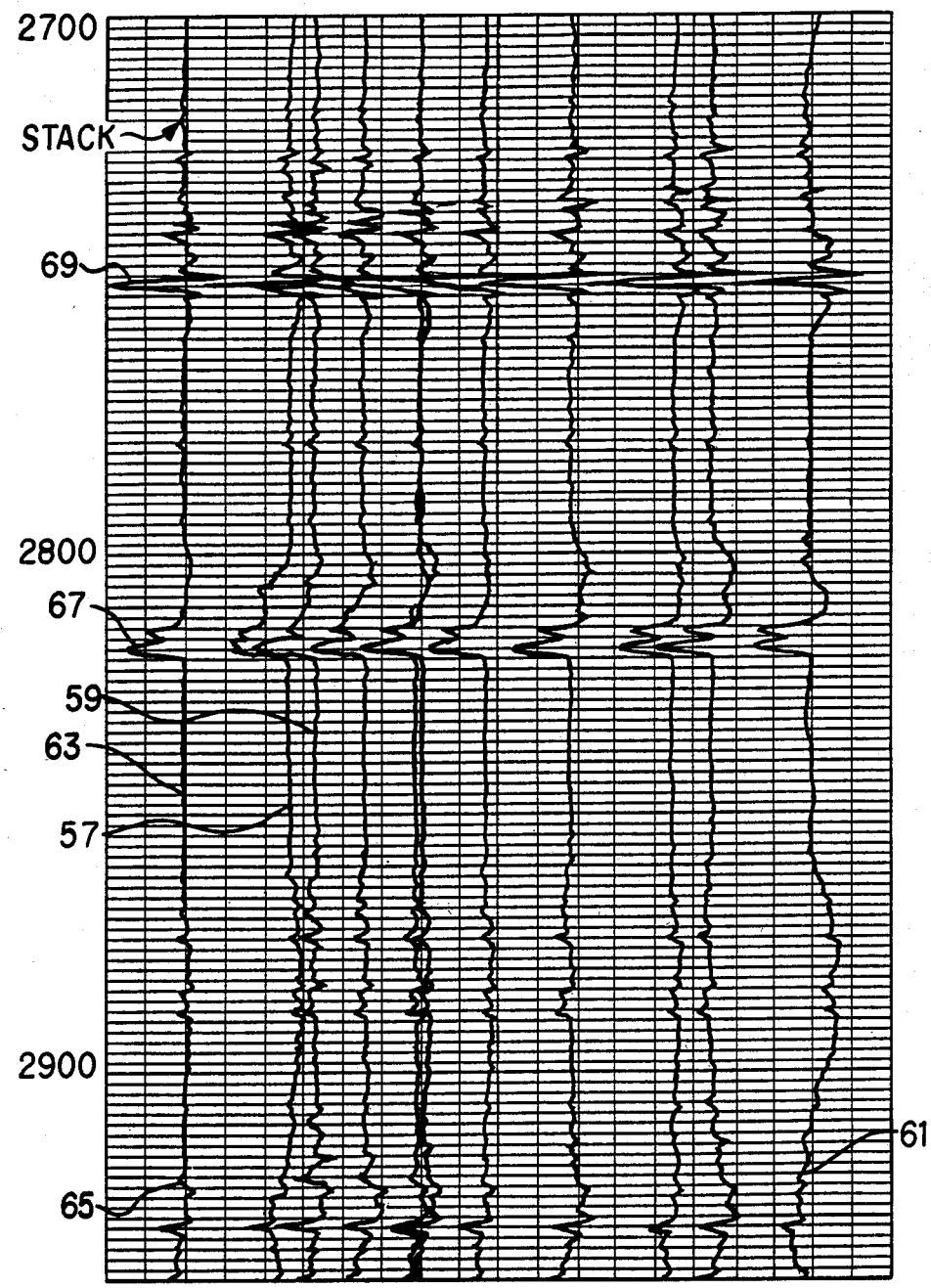
FIG. 10 is a well log chart showing differential energy measurements obtained from different pairs of receivers and a stacked waveform in accordance with the invention.

FIG. 10 of the drawings shows typical well log chart of normalized differential energy curves obtained from pairs of receivers 19 spaced by one foot intervals plotted with respect to the depth in the borehole 13. Thus curve 57 is obtained from the pair of receivers 19.10 and 19.12, curve 59 is obtained from the pair of receivers 19.9 and 19.11, and so forth across the array. Curve 61 is obtained from receivers 19.1 and 19.3.

As is seen for an examination of FIG. 10 most of the slow variations in the differential energy curves do not correlate across the array. In practice this noise especially affects receiver pairs located towards the ends of the array and somewhat anticorrelates between opposite ends. This might be because of tilting of the tool 11 in the borehole 13 during the well logging operation. In addition, the effect of variations in the gain of the pairs of receivers 19 shows up as lateral shiftings of the corresponding curves since the logarithms of the differential energies are plotted. If the gains of all the receivers 19 were equal the waveforms would be equally spaced across the log of FIG. 10. In many applications this lateral shift is not a serious problem since one is normally interested in variations in the differential energy curves rather than their absolute values. It is thus an additional advantage of the method of the invention that it is not necessary to calibrate the individual receiver 19 in order to make meaningful measurements.

In order to eliminate these spurious variations in the normalized differential energy curves such as shown in FIG. 10, in accordance with the method of the invention the individual curves are stacked by aligning them on the basis of depth, adding the aligned individual curves together and dividing by the number of individual curves in accordance with the following formula to obtain the stacked normalized differential energy:

$$NDE_{j\;STK} = \frac{1}{n-j} \sum_{j=1}^{n-j} \frac{SE_{i+j} - SE_i}{0.5j}$$

Where:
  j is the stack index representing the number of inter-receiver spacings in the measurement interval;
  $SE_i$ is the low frequency Stoneley energy at receiver i; and
  n is the total number of receivers in the array.

The stacked differential energy log 63 is shown at the left hand side of the well log of FIG. 10. An examination of the stacked log 63 shows that it is free from the spurious effects noted above and contains only the features that correlate well across all pairs of receivers 19. These correlated features are often small localized events which would be interpreted as noise if they did not appear on all receiver pairs. In addition, variations in the gains of the various receivers 19 are averaged out so that the stacked log 63 gives more reliable and detailed information concerning the formations than any of the individual differential energy curves.

In a similar manner to that illustrated in FIG. 10 it is possible to obtain other stacked logs for different receiver pair spacings which, in the illustrated embodiment, can range from 6 inches to 66 inches. When examining the stacked logs for different receiver pair spacings it has been observed that the direction of the deflection for each of them is conserved in different stacks. Even in a stack for receiver pairs having a very small spacing such as six inches, which is about ⅓ the wave length of the Stoneley wave, the definition of the log is retained and the signal to noise ratio is reasonably good because of the noise rejection performed by the stacking process.

When results achieved with the stacked differential Stoneley energy log 63 obtained with a method of the invention are compared to measurements taken by other methods such as a caliper or a core, it has been found that the shape of the variations in the stacked log is indicative of what causes them. For example, an enlargement of the borehole 13 shows as an anti-symmetric feature starting with a decrease in the energy follow by an increase of about the same amount. This is easy to understand since when the section of the borehole 13 increases, the same amount of energy is distributed over a larger area and the amplitude thus decreases. Bed boundary effects are generally rather small and show as reversed antisymmetric features starting with an increase followed by a decrease in energy, for instance see portion 65 of the stacked log 63.

Fractures are easy to recognize in the stacked normalized differential energy logs 63 since they cause an energy drop not followed by a positive peak. For instance the portion 67 of the log 63 indicates a fracture at a depth of 2814 feet. When a fracture is associated with a borehole enlargement or a bed boundary, the response is a combination of both effects, for instance as illustrated in portion 69 of log 63 indicating an event at 2745 feet. It is still possible however to derive information concerning such a fracture by looking at the net energy drop caused by the fracture across the zone.

Figure 11:
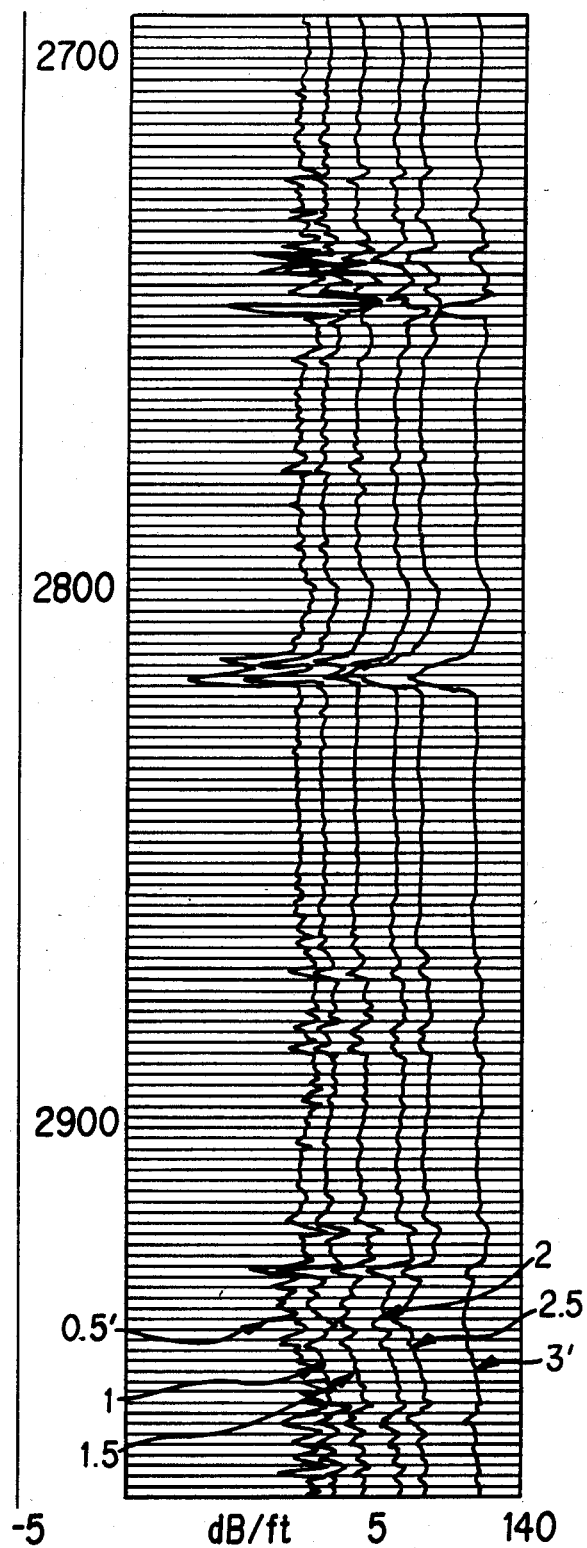
FIG. 11 is a well log chart of stacked differential energy logs according to the invention for receivers having different separations.

FIG. 11 of the drawings shows a typical set of six stacked differential energy logs for receiver pairs having separations of between 0.5 and 3 feet. As is apparent from the figure the stacked logs obtained from receiver pairs with larger separations such as 2.5 to 3 feet have less vertical resolution and the variations due to bed boundaries and small borehole irregularities tend to average out. The indications of major features such as fractures are consistent across the different separations, however, both in vertical extent and amplitude. Differential energy stacks from differently spaced receiver pairs can be used to quickly locate and analyze fractures. The larger events such as fractures are easier to locate by looking first at the large interval measurement stacks. The large interval measurement stacks give a good idea of the vertical extent of the fracture. The shorter interval measurement stacks such as 0.5 to 1.5 feet give much more detailed information about the amplitude of the energy differential and the makeup of the fracture. This is especially important since the simplified image of a single fracture plane intercepting a borehole is rarely a valid representation of actual fractured systems. The fine vertical resolution provided by the method in accordance with the invention is necessary for accurate interpretation of the formation.

Since the amplitude of the energy difference in the stacked log 63 is a function of the fluid flow in the fracture, this amplitude can be used to compare the magnitude and flow capabilities of different fracture intervals.

Figure 12:
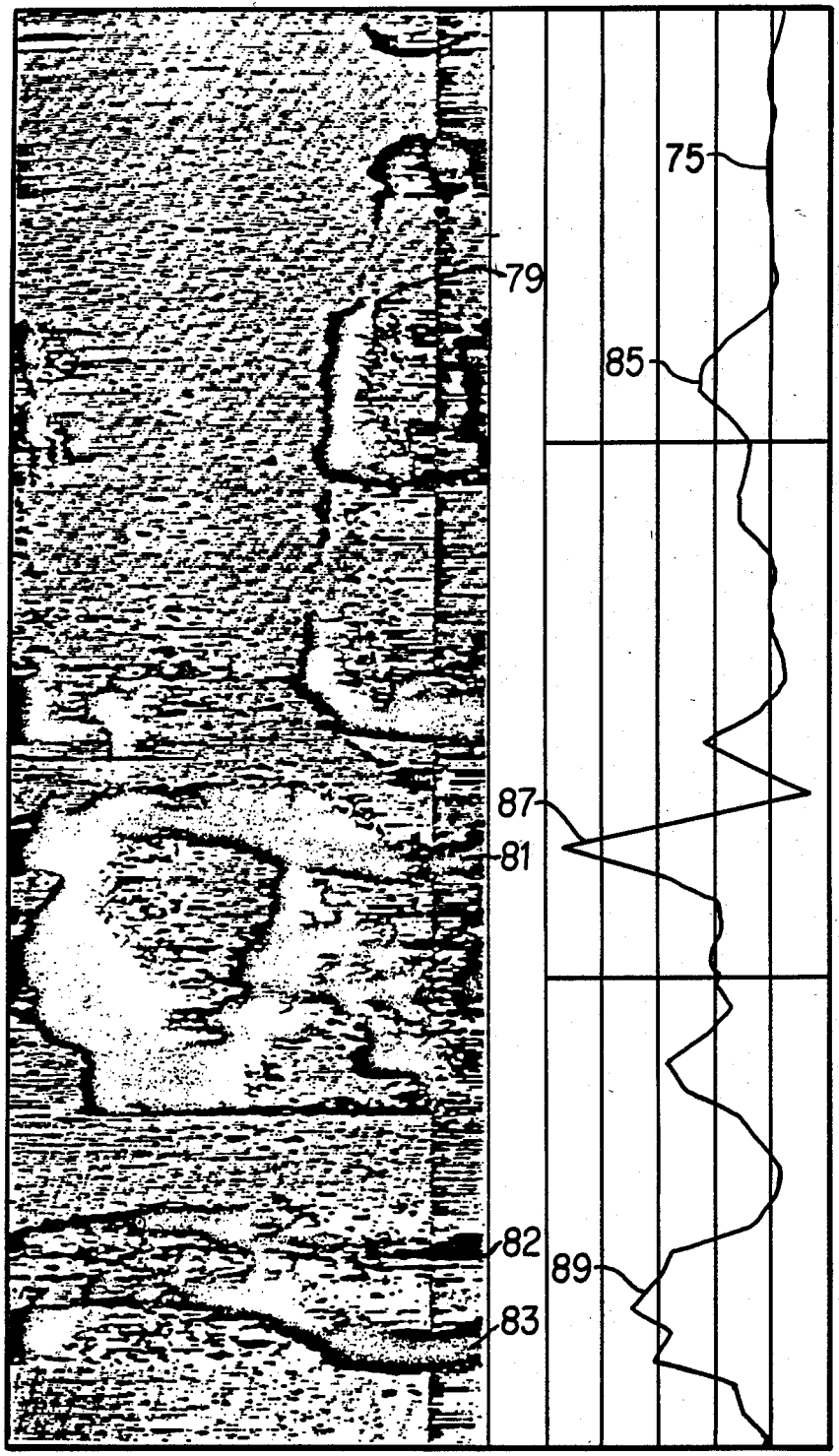
FIG. 12 shows a comparison of a stacked differential energy waveform according to the invention to a borehole televiewer image.

The close correspondence between the results obtained from a stacked differential energy log 75 and image 77 obtained from the well known borehole televiewer tool over a short section of an actual borehole is seen in FIG. 12. The dark area is the borehole televiewer image indicates fractured areas intersecting the borehole wall and include a substantially vertical fracture 79 extending along the upper two thirds of the image which is intersected by a horizontal fracture 81. Another horizontal fracture 83 appears in the lower portion of the image. The stacked log 75 is generated by stacked differential energy measurements for pairs of receivers having a 6 inch spacing. The variations in the log 75 closely match the results of the borehole televiewer, particularly at the indications of fractured areas at locations 85, 87 and 89.

Referring again to FIG. 9 of the drawings, a variation in the manner of obtaining the stacked differential energy measurements in accordance with the invention will be described. In the method described above, the differential energy measurements are obtained by taking the difference of the logarithms of the energy measured by pairs of receivers 19. This technique can be referred to as "receiver section processing". It is also possible to obtain differential energy measurements in accordance with the invention by what can be referred to as "transmitter section processing". In accordance with this technique, the portion of the borehole 13 being investigated is that portion through which the transmitter 13 is passing. As the tool 11 is drawn upwardly through the borehole it moves an increment of six inches between successive firings of the acoustic transmitter 17. The energy in the portion of the waveform corresponding to the propagation mode of interest generated by the receiver 19.12 adjacent location 71 is measured when the tool is in position 1 of FIG. 9. On the next shot of the transmitter 17, when the tool 11 is in position 2 in FIG. 9, the corresponding energy detected by receiver 19.11 is measured. In like manner, the measurements continue across the array until when the tool is in position 10 in FIG. 9 the measurement of the energy detected by receiver 19.3 is made since that receiver is adjacent location 71. On the following two shots of the transmitter 17 the receivers 19.2 and 19.1 are adjacent location 71 and yield an additional two energy measurements.

The differential energy sensed by the receivers 19 adjacent the depth 71 is calculated between pairs of shots of the transmitter 17 and the results is normalized by dividing by the distances between the locations of the transmitter 17 at the selected pairs of shots. In this way, additional normalized differential energy measurements are obtained which are referred to the location in the borehole 13 midway between the positions of the transmitter 17 at the times of the selected pairs of shots. For instance, in FIG. 9 if the first and third shots of the transmitter 17 are selected the transmitter differential energy calculated would be referred to depth 73 midway between the locations of the transmitter 17 at the times of the two shots.

Referring again to the tool 11 in position 1 in FIG. 9, an additional set of differential energy measurements may be obtained based on measurements taken by the successive receivers adjacent location 55 on the wall of borehole 13. These measurements are referred to the same transmitter depth intervals as those determined from measurements taken by the receivers adjacent location 71. Thus receiver 19.11 senses the acoustic waveform generated by the activation of the transmitter 17 at the location shown in position 1. On the next shot, when the tool 11 is in position 2, the acoustic waveform detected by receiver 19.10 is measured. In like manner the energies sensed by the receiver 19.9 through 19.1 are measured on subsequent shots of transmitter 17 as those receivers become adjacent location 55. The differential energies sensed by the receivers 19 adjacent location 55 for pairs of shots of transmitter 17 are determined and normalized as before and referred to the depth midway between positions of the transmitter 17 for each pair of shots.

This process is repeated for the locations on the wall of borehole 13 adjacent each of the receivers 19.10 through 19.2 to generate 11 sets of transmitter section differential energy measurements related to 12 successive positions of transmitter 17. These transmitter section measurements are independent of those of the receiver section measurements and can be stacked in the same manner as the receiver section measurements to yield additional stacked differential energy waveforms versus depth.

In accordance with another feature of the invention receiver section and transmitter section differential energy measurements related to the same depth intervals can be stacked together for an improved measurement. It has been found that the variations in the differential energy measurements as a result of effects such as bed boundaries and borehole enlargements anticorrelate in that the differential energy curves for the two different types of processing experience corresponding deflections in opposite senses as a result of such occurrences. Therefore when the measurements are stacked these variations tend to cancel out leaving only the fracture caused variations.

The references to stacking measurements in the illustrated embodiment have been in regard to adding the measurements and optionally normalizing them by dividing by the number of measurements being stacked. The stacking in accordance with the invention may however include other types of processing such as, for instance, the weighting of various measurements differently or other methods of combining the measurements.

While the illustrated embodiment of the invention has been described in connection to acoustic measurements, the method may also find use in borehole measurement with other forms of energy such as electrical or nuclear. In that event instead of acoustic transducers such as the acoustic transmitter 17 and receivers 19, other types of transducers would be used as energy sources and detectors.

In addition, for acoustic measurements, since the energy content of the Stoneley wave is much higher than that of the compression and shear waves it is possible in some applications to process the entire waveform detected by the receivers 19 rather than selecting only the Stoneley wave portions.

What is claimed is:

1. A method for measuring characteristics of subsurface earth formations penetrated by a borehole from waveforms received by an array of at least three acoustic pulse receivers spaced axially along said borehole in response to a series of acoustic pulses generated by an acoustic pulse transmitter as said transmitter and receivers are moved along said borehole in fixed relationship with one another, said method comprising the steps of:
   (a) determining for each of said waveforms a differential energy measurement for a given acoustic propagation mode and a given receiver pair, said differential energy measurement being representative of the differential energies between said given receiver pairs as they correspond to locations along the borehole, thereby obtaining a plurality of said differential energy measurements based on the plurality of acoustic pulses;
   (b) assigning each of said differential energy measurements a depth reference associated with the location of said given receiver pairs at the time corresponding to the receipt of said waveforms; and
   (c) stacking said plurality of differential energy measurements for each depth reference.

2. The method of claim 1 wherein said step of determining measurements includes the step of selecting a part of the waveforms generated by pairs of said receivers in response to acoustic pulses generated by said transmitter, said part corresponding to said given acoustic propagation mode.

3. The method of claim 2 wherein said step of determining measurements includes the steps of:
   (a) determining quantities representative of the logarithm of the energies in the given propagation mode received by each of the receivers of said pairs; and
   (b) for each of said acoustic pulses and for each of said pairs of receivers subtracting the quantity determined for one of the receivers of the pair from that determined for the other of the receivers of the pair.

4. The method of claim 2 wherein said given propagation mode is the Stoneley wave and said step of selecting a part of the waveforms includes the step of filtering said wave forms to remove frequency components not associated with the Stoneley wave.

5. The method of claim 4 wherein said step of selecting a part of the waveforms further includes the steps of:
   (a) defining a time window associated with the Stoneley wave portion of each of said waveforms; and
   (b) rejecting the portions of said waveforms outside of said window.

6. The method of claim 2 wherein said step of selecting a part of said waveforms includes the step of defining time windows for each of said receivers for isolating the parts of said waveforms corresponding to said given propagation mode.

7. The method of claim 1 wherein said pairs of receivers all have the same spacing.

8. The method of claim 3 wherein the step of determining quantities representative of the logarithm of the energy includes the steps of:
   (a) integrating a portion of the energy represented by the selected part of said waveforms; and
   (b) taking the logarithm of the integrated energy.

9. The method of claim 8 wherein said step of integrating the energy includes the steps of:
   (a) digitizing said waveforms;
   (b) taking the sum of the squares of the amplitudes of the samples of the selected part of the digitized waveform; and
   (c) dividing said sum by the number of samples being summed.

10. The method of claim 1 wherein each of said pairs of receivers are separated by the same distance and wherein the step of stacking includes the steps of:
    (a) summing the measurements obtained from each of said pairs of receivers which are referred to the same depth, and
    (b) dividing each summed measurements by the number of measurements in the sum.

11. The method of claim 3 wherein said step of determining measurements further includes the step of normalizing the remainder resulting from subtracting said quantities for the spacing between the receivers of the pair.

12. The method of claim 11 wherein said step of normalizing includes the step of dividing said remainder by the spacing between the receivers of the pair.

13. The method of claim 6 wherein said step of determining measurements includes for each of said waveforms the steps of:
   (a) locating for each of said waveforms the frequency of the highest amplitude in the frequency domain of said selected part of said waveform falling within particular frequency limits, and
   (b) determining the energy represented by the frequency domain waveform in a band of frequencies around said located frequency wherein the width of said band is determined with relation to the width of said time windows.

14. A method for measuring characteristics of subsurface earth formations traversed by a borehole from waveforms generated by an array of acoustic pulse receivers spaced along a logging tool in said borehole in response to acoustic pulses generated by an acoustic pulse transmitter spaced from said receivers on said tool as said tool is drawn along the borehole, comprising the steps of:
   (a) generating a first plurality of sets of differential energy measurements referenced to a first common set of depths in the borehole, each of said sets of measurements being representative of the differential energy in a given acoustic propagation mode sensed by a different pair of receivers in said array in response to said acoustic pulses, and
   (b) stacking said differential energy measurements to obtain a log of stacked differential energy versus depth.

15. The method of claim 14 wherein said step of generating sets of differential energy measurements includes the steps of:
   (a) selecting the part of the waveforms generated by said receivers in response to said acoustic pulses which corresponds to said given acoustic propagation mode; and
   (b) determining a set of differential energy measurements from the selected part of the waveforms generated by said receivers for each of said pairs of receivers.

16. The method of claim 14 wherein said characteristics being measured are fractures in the formations intersecting the borehole and wherein said given acoustic propagation mode is the Stoneley wave.

17. The method of claim 14 wherein said step of generating a plurality of sets of differential energy measurements includes the steps of:
   (a) repeatedly actuating said acoustic pulse transmitter to generate a plurality of acoustic pulses;
   (b) sensing the arrivals of acoustic energy at said receivers in response to said pulses;
   (c) selecting the portion of the waveforms generated by said receivers corresponding to said given acoustic propagation mode; and
   (d) determining the differential energies in said waveform portions for each of said pairs of receivers.

18. The method of claim 14 further including the steps of:
   (a) generating a second plurality of sets of differential energy measurements referenced to a second common set of depths in the borehole each of said sets of measurements being representative of the differential energy in a given acoustic propagation mode sensed by receivers in said array in response to pairs of said acoustic pulses wherein said second common set of depths is determined with relation to the positions of said acoustic pulse transmitters at the times of the generation of the pulses of said pairs of pulses.

19. The method of claim 18 wherein said steps of stacking further includes the step of stacking said second plurality of differential energy measurements with the first plurality of differential energy measurements to obtain a combined log of stacked differential energies versus depth.

20. A method for measuring characteristics of subsurface earth formations traversed by a borehole with a plurality of acoustic transducers spaced axially along said borehole as said transducers are moved along said borehole in fixed relationship with one another, said transducers including two types, the first type being an acoustic pulse transmitter and the second type being an acoustic pulse receiver, comprising the steps of:
   (a) generating a plurality of differential energy measurements relating to depth intervals in said borehole, each measurement representing the differential energy in a given acoustic propagation mode between an acoustic pulse that has traversed one of said depth intervals and one that has not, said pulse that has traversed said one of said depth intervals and the one that has not having otherwise substantially identical paths in said borehole, and
   (b) stacking said measurements by depth interval to obtain a log of stacked differential energy versus depth.

21. The method claim 20 wherein said plurality of transducers includes an acoustic transmitter and at least three acoustic receivers and wherein said step of generating measurements includes the steps of:
   (a) generating a plurality of acoustic pulses;
   (b) for each of said pulses determining measurements representative of the differential energies received by pairs of said receivers in a given acoustic propagation mode.

22. A method of claim 21 wherein said step of determining measurements includes the steps of:
   (a) selecting a portion of the waveforms generated by each of the receivers of said pairs of receivers in response to acoustic pulses generated by said transmitter, said portion corresponding to said given acoustic propagation mode;
   (b) determining for each of said waveform portions a quantity representative of the energy in said waveform portion;
   (c) determining the ratio of the said quantities for each of said pairs of receivers.

23. The method of claim 20 wherein said step of determining the ratio of said quantities comprises the steps of taking the logarithms of such quantities and subtracting said logarithms.

24. The method of claim 20 wherein said step of stacking said measurements by depth interval includes the steps of:
   (a) adding for each depth interval, the measurements relating to said depth interval to obtain a summed measurement; and
   (b) dividing by the number of measurements making up said summed measurement.

25. The method of claim 20 wherein said characteristics include fractures and said given acoustic propagation mode includes the Stoneley wave and wherein said step of stacking said measurements by depth intervals includes the steps of:

(a) adding for each depth interval, the measurements relating to said depth interval to obtain a summed measurement; and (b) dividing by the number of measurements making up said summed measurement.

26. The method of claim 20 wherein said plurality of transducers includes at least three acoustic receivers and a acoustic transmitter and wherein said step of generating a plurality of differential energy measurements includes the steps of:

(a) generating a plurality of acoustic pulses at a series of positions of said transmitter along said borehole;

(b) determining measurements representative of the differential energies detected by said receivers in response to pairs of said acoustic pulses; and (c) referring each measurement to the depth interval between the position of said acoustic transmitter at the times of the pair of pulses from which said measurement was determined.

27. A method for measuring characteristics of subsurface earth formations traversed by a borehole with a plurality of transducers spaced axially along said borehole as said transducers are moved along said borehole in fixed relationship with one another, said transducers including two types, the first type being an pulse energy source and the second type being an energy detector, comprising the steps of:

(a) generating a plurality of differential energy measurements relating to depth intervals in said borehole, each measurement representing the differential energy between a pulse generated by a source transducer which pulse has traversed one of said depth intervals and one that has not, said pulse that has traversed said one of said depth intervals and the one that has not having otherwise substantially identical paths in said borehole, and (b) stacking said measurements by depth intervals to obtain a log of stacked differential energy versus depth.

28. The method of claim 27 wherein said plurality of transducers includes an acoustic transmitter and at least three acoustic receivers and wherein said step of generating measurements includes the steps of:

(a) generating a plurality of acoustic pulses;

(b) for each of said pulses determining a first set of measurements representative of the differential energies received by pairs of said receivers in a given acoustic propagation mode.

29. The method of claim 28 wherein said step of generating a plurality of differential energy measurements further includes the step of determining a second set of measurements representative of the differential energies in said given acoustic propagation mode detected by said receivers in response to pairs of said pulses.

30. A method for detecting and evaluating fractures in subsurface formations intersecting a borehole with a tool carrying an array of acoustic receivers which generate outputs indicative of received acoustic energy as said tool is moved through said borehole, comprising the steps of:

(a) exciting a series of Stoneley acoustic waves in said borehole;

(b) determining measurements related to the energy sensed by each of said receivers in response to each of said Stoneley waves;

(c) determining for each of said Stoneley waves, a differential energy between pairs of said receivers as indicated by said measurements each of said pair of receivers being separated by the same distance;

(d) referring said differential wave energies to depths in said borehole associated with the corresponding ones of said pairs of receivers at the time of said measurements; and (e) stacking said differential Stonley wave energies by depth.

31. In a well logging tool having acoustic pulse generating means and a first and a second receiver, the tool for use in a borehole traversing subsurface formations, a method of obtaining a stacked differential energy measurement between a first and a second point along the borehole, said method comprising the steps of:

(a) locating the first and second receivers at the first and second points, respectively, along the borehole;

(b) generating an acoustic pulse;

(c) receiving said generated pulse at the first and second receivers;

(d) calculating a first and a second energy value of said received waveform received at the first and second receivers, respectively;

(e) determining the difference between said first and second calculated energy values, thereby obtaining a differential energy measurement between the first and second points;

(f) repeating steps (b) through (e) at least one additional time, thereby obtaining a plurality of differential energy measurements; and (g) averaging said plurality of differential energy measurements, thereby obtaining a stacked differential energy measurement between the first and second points.

32. The method of claim 31, wherein in the step of calculating said first and second energy values, said first and second energy values are contained in a predetermined frequency band of said received waveform received at the first and second receivers, respectively.

33. In a well logging tool having acoustic pulse generating means and a first, second and third receiver, the tool for use in a borehole traversing subsurface formations, a method of obtaining a stacked differential energy measurement between a first and a second point along the borehole, said method comprising the steps of:

(a) locating the first and second receivers at the first and second points, respectively, along the borehole;

(b) generating an acoustic pulse;

(c) receiving said generated pulse at the first and second receivers;

(d) calculating a first and a second energy value of said received waveform received at the first and second receivers, respectively;

(e) determining the difference between said first and second calculated energy values, thereby obtaining a differential energy measurement between the first and second points;

(f) locating the second and third receivers at the first and second points, respectively, along the borehole;

(g) generating an acoustic pulse;

(h) receiving said generated pulse at the second and third receivers;

(i) calculating a third and fourth energy value contained in a predetermined frequency band of said received waveform received at the second and third receivers, respectively;
(j) determining the difference between said third and fourth calculated energy values, thereby obtaining a differential energy measurement between the first and second points; and
(k) averaging the plurality of differential energy measurements, thereby obtaining a stacked differential energy measurement between the first and second points.

34. The method of claim 33, wherein in the step of calculating said first and second energy values, said first and second energy values are contained in a predetermined frequency band of said received waveform received at the first and second receivers, respectively.

35. In a well logging tool having acoustic pulse generating means and a plurality of receivers, the tool for use in a borehole traversing subsurface formations, a method of obtaining a stacked differential energy measurement between a first and a second point along the borehole, said method comprising the steps of:
(a) locating a receiver at the first point along the borehole;
(b) locating a receiver at the second point along the borehole;
(c) generating an acoustic pulse;
(d) receiving said generated pulse at the receivers located at the first and second points;
(e) calculating a first and a second energy value of said received waveform received at the receivers located at the first and second points, respectively;
(f) determining the difference between said first and second calculated energy values, thereby obtaining a differential energy measurement between the first and second points;
(g) repeating steps (a) through (f) at least one additional time, thereby obtaining a plurality of differential energy measurements; and
(h) averaging said plurality of differential energy measurements, thereby obtaining a stacked differential energy measurement between the first and second points.

36. The method of claim 35, wherein in the step of calculating said first and second energy values, said first and second energy values are contained in a predetermined frequency band of said received waveform received at the first and second receivers, respectively.

37. In a well logging tool having acoustic pulse generating means and a plurality of receivers, the tool for use in a borehole traversing subsurface formations, a method of obtaining a stacked differential energy measurement between a first and a second point along the borehole, said method comprising the steps of:
(a) locating a receiver at the first point along the borehole;
(b) locating a receiver at the second point along the borehole;
(c) generating an acoustic pulse a plurality of times;
(d) determining a differential energy measurement between the first and second points for each sonic pulse generated;
(e) repeating steps (a) through (f) at least one additional time, thereby obtaining a plurality of differential energy measurements, thereby obtaining a plurality of differential energy measurements; and
(f) averaging said plurality of differential energy measurements, thereby obtaining a stacked differential energy measurement between the first and second points.

38. In a well logging tool having at least a first and a second transmitter and at least a first receiver, the tool for use in a borehole traversing subsurface formations, a method of obtaining a differential energy measurement between a first and a second point along the borehole, said method comprising the steps of:
(a) locating the first and second transmitters at the first and second points, respectively, along the borehole;
(b) generating an acoustic pulse from the first transmitter;
(c) receiving said first generated pulse at the first receiver;
(d) calculating a first energy value of said first received waveform received at the first receiver;
(e) generating an acoustic pulse from the second transmitter;
(f) receiving said second generated pulse at the first receiver;
(g) calculating a second energy value of said second received waveform received at the first receiver; and
(h) determining the difference between said first and second calculated energy values, thereby obtaining a differential energy measurement between the first and second points.

39. The method of claim 38, wherein in the steps of calculating said first and second energy values, said first and second energy values are contained in a predetermined frequency band of said received waveform received at the first receiver.

40. The method of claim 39, said method further comprising the steps of:
(i) repeating steps (b) through (h) at least one additional time, thereby obtaining a plurality of differential energy measurements; and
(j) averaging said plurality of differential energy measurements, thereby obtaining a stacked differential energy measurement between the first and second points.

41. The method of claim 38, said method further comprising the steps of:
(i) repeating steps (b) through (h) at least one additional time, thereby obtaining a plurality of differential energy measurements; and
(j) averaging said plurality of differential energy measurements, thereby obtaining a stacked differential energy measurement between the first and second points.

42. In a well logging tool having at least a first transmitter and at least a first and a second receiver, the tool for use in a borehole traversing subsurface formations, a method of obtaining a differential energy measurement between a first and a second point along the borehole, said method comprising the steps of:
(a) locating the first transmitter at the first point along the borehole;
(b) locating the first receiver at a third point along the borehole;
(c) generating a first acoustic pulse;
(d) receiving said generated first pulse at the first receiver;
(e) calculating a first energy value of said received at the first receiver;
(f) locating the first transmitter at the second point along the borehole;

(g) locating the second receiver at the third point along the borehole;

(h) generating a second acoustic pulse;

(i) receiving said generated second pulse at the second receiver;

(j) calculating a second energy value of said received waveform received at the second receiver; and (k) determining the difference between said first and second calculated energy values, thereby obtaining a differential energy measurement between the first and second points.

43. The method of claim 42, wherein in the steps of calculating said first and second energy values, said first and second energy values are contained in a predetermined frequency band of said received waveform received at the first and second receivers, respectively.

44. In a well logging tool having at least a first transmitter and at least a first, a second and a third receiver, the tool for use in a borehole traversing subsurface formations, a method of obtaining a stacked differential energy measurement between a first and a second point along the borehole, said method comprising the steps of:

(a) locating the first transmitter at the first point along the borehole;

(b) locating the second receiver at a third point along the borehole;

(c) locating the third receiver at a fourth point along the borehole;

(d) generating a first acoustic pulse;

(e) receiving said generated first pulse at the second and third receivers;

(f) calculating a first and second energy value of said received waveform received at the second and third receivers, respectively;

(g) locating the first transmitter at the second point along the borehole;

(h) locating the first receiver at the third point along the borehole;

(i) locating the second receiver at the fourth point along the borehole;

(j) generating a second acoustic pulse;

(k) receiving said generated second pulse at the first and second receivers;

(l) calculating a third and fourth energy value of said received waveform received at the first and second receivers, respectively;

(m) determining the difference between said first and third calculated energy values and said second and fourth calculated energy values, thereby obtaining a plurality of differential energy measurement between the first and second points; and (n) averaging said plurality of differential energy measurements, thereby obtaining a stacked differential energy measurement between the first and second points.

45. The method of claim 44, wherein in the steps of calculating said first, second, third and fourth energy values, said energy values are contained in a predetermined frequency band of said received waveform received at the first and second receivers, respectively.

46. In a well logging tool having at least a first transmitter and at least a first and a second receiver, the tool for use in a borehole traversing subsurface formations, a method of obtaining a stacked differential energy measurement between a first and a second point along the borehole, said method comprising the steps of:

(a) locating the first and second receivers at the first and second points along the borehole, respectively;

(b) locating the first transmitter at a third point along the borehole;

(c) generating a first acoustic pulse;

(d) receiving said generated first pulse at the first and second receivers;

(e) calculating a first and second energy value of said received waveform received at the first and second receivers, respectively;

(f) determining the difference between said first and second calculated energy values, thereby obtaining a first differential energy measurement between the first and second points;

(g) locating the first transmitter at the first point along the borehole;

(h) locating the second receiver at a fourth point along the borehole;

(i) generating a second acoustic pulse;

(j) receiving said generated second pulse at the second receiver;

(k) calculating a third energy value of said received waveform received at the second receiver;

(l) locating the first transmitter at the second point along the borehole;

(m) locating the first receiver at the fourth point along the borehole;

(n) generating a third acoustic pulse;

(o) receiving said generated third pulse at the first receiver;

(p) calculating a fourth energy value of said received waveform received at the first receiver;

(q) determining the difference between said third and fourth calculated energy values, thereby obtaining a second differential energy measurement between the first and second points; and (r) averaging said plurality of differential energy measurements, thereby obtaining a stacked differential energy measurement between the first and the second points.

47. The method of claim 46, wherein in the steps of calculating said first, second third and fourth energy values, said energy values are contained in a predetermined frequency band of said received waveform received at the first and second receivers, respectively.

* * * * *